United States Patent
Chigusa et al.

(10) Patent No.: US 7,201,501 B2
(45) Date of Patent: Apr. 10, 2007

(54) LIGHTING DEVICE FOR A VEHICLE AND METHOD FOR CONTROLLING LIGHT DISTRIBUTION OF THE LIGHTING DEVICE

(75) Inventors: Yuji Chigusa, Kariya (JP); Kazuhisa Okumura, Kariya (JP)

(73) Assignee: Denso Corporation (JP)

( * ) Notice: Subject to any disclaimer, the term of this patent is extended or adjusted under 35 U.S.C. 154(b) by 94 days.

(21) Appl. No.: 10/634,801

(22) Filed: Aug. 6, 2003

(65) Prior Publication Data

US 2004/0027834 A1    Feb. 12, 2004

(30) Foreign Application Priority Data

Aug. 7, 2002    (JP)    ............... 2002-230514

(51) Int. Cl.
*B60Q 1/00*    (2006.01)

(52) U.S. Cl. ............... 362/465; 362/242; 362/511; 362/544; 362/545; 362/555; 362/466

(58) Field of Classification Search ............... 362/465, 362/466, 511, 543–545, 555, 520, 242, 244; 315/291

See application file for complete search history.

(56) References Cited

U.S. PATENT DOCUMENTS

| | | | |
|---|---|---|---|
| 5,570,951 A * | 11/1996 | Bertling et al. | ............. 362/545 |
| 5,697,690 A | 12/1997 | Okuchi et al. | |
| 6,211,626 B1 * | 4/2001 | Lys et al. | .............. 315/291 |
| 6,296,376 B1 | 10/2001 | Kondo et al. | |
| 6,371,635 B2 * | 4/2002 | Ott et al. | .............. 362/511 |
| 6,406,172 B1 * | 6/2002 | Harbers et al. | ............. 362/544 |
| 6,530,683 B1 * | 3/2003 | Ohkohdo et al. | ........... 362/511 |
| 6,767,120 B2 * | 7/2004 | Ohtsuka et al. | ............. 362/511 |

FOREIGN PATENT DOCUMENTS

| | | |
|---|---|---|
| DE | 200 12 483 | 1/2001 |
| GB | 2 358 914 | 8/2001 |
| JP | 6-53294 | 7/1994 |
| JP | 7-288011 | 10/1995 |
| JP | 10-109587 | 4/1998 |
| JP | 10-228803 | 8/1998 |
| JP | 2000-331508 | 11/2000 |
| JP | 2001-126510 | 5/2001 |
| JP | 3080310 | 7/2001 |
| JP | 2001-291901 | 10/2001 |

OTHER PUBLICATIONS

European Search Report dated Dec. 19, 2006 issued in foreign counterpart European Application 03017976.6.

* cited by examiner

*Primary Examiner*—Stephen F Husar
(74) *Attorney, Agent, or Firm*—Nixon & Vanderhye PC

(57) ABSTRACT

A lighting device for a vehicle includes multiple light emitting devices. Each light emitting device is constructed of a light emitting diode as a light source and a light guide lens for guiding light emitted from the light emitting diode. The light emitting devices are formed in convex light emitting devices and fan-shaped light emitting devices. The convex devices and the fan-shaped devices have different light distribution characteristics. Therefore, light distribution areas and intensity of the lighting device are more flexibly adjusted than other lighting devices using light emitting diodes as light source.

14 Claims, 7 Drawing Sheets

LIGHTING DEVICE FOR A VEHICLE AND METHOD FOR CONTROLLING LIGHT DISTRIBUTION OF THE LIGHTING DEVICE

CROSS REFERENCE TO RELATED APPLICATION

This application is based on and incorporates herein by reference Japanese Patent Application No. 2002-230514 filed on Aug. 7, 2002.

FIELD OF THE INVENTION

The present invention relates to a lighting device for a vehicle and a method for controlling a light distribution of the lighting device.

BACKGROUND OF THE INVENTION

A lighting device for a vehicle is used in different applications including head lamps, fog lamps, tale lamps, break lamps, and turn signal lamps. The vehicle includes passenger vehicles, motorcycles, bicycles, construction vehicles, and aircrafts. The lighting device has a light source, such as an incandescent lamp and a halogen lamp, a reflector, and a lens to obtain desired characteristics of the light distribution.

The incandescent lamp and the halogen lamp are not efficient in converting electricity to light. Thus, a large amount of electricity is required to produce light of desirable intensity. This may lower the fuel economy in an engine-driven vehicle and the mileage per charge in an electric vehicle.

Furthermore, lifetimes of the incandescent lamp and the halogen lamp are normally shorter than a lifetime of a vehicle. Thus, the number of periodical replacement of the lamps increases according to the period that the vehicle is used, that is, the number of times that the lamp is used. Even when a high intensity discharge (HID) lamp that has a longer lifetime than the halogen lamp is used, periodical replacement of the lamp is required. If daytime-lighting becomes mandatory for safety, the lifetime of the lamps may become a critical issue.

To solve the above-described problems, lighting devices using light emitting diodes (LEDS) as light sources are suggested in JP-A-10-228803, JP-A-2001-291901, JP-U-3080310, JP-A-10-109587, JP-A-2001-126510, JP-U-6-53294, JP-A-2000-331508, JP-A-7-288011, and JP-A-2000-58925. The LEDs is highly efficient in converting electricity to light and has long lifetimes. On the other hand, the LEDs have narrow lighting areas and small angles. Thus, lighting devices constructed of LEDs, a reflector, and a lens cannot provide desirable light distribution.

In JP-A-2001-291901, it is suggested that a plurality of LEDs are mounted in a lens and the lens is shaped so that desirable light distribution is produced. In JP-A-10-228803, it is suggested that focal distances of convex lenses of LEDs are adjusted to the same length to produce desirable light distribution. However, the suggested lighting devices do not provide much flexibility in altering light distribution.

SUMMARY OF THE INVENTION

The present invention therefore has an objective to provide a lighting device that provides flexibility in altering light distribution. The present invention has another objective to provide a method for controlling the light distribution of the lighting device.

A lighting device of the present invention includes multiple light emitting devices, each of which is constructed of a light emitting diode (LED) as a light source and a light guide lens. The light emitting devices are configured to have different optical characteristics. An application of the light emitting devices having different optical characteristics has increased flexibility in altering light distribution.

The LED is highly efficient in converting electricity to light and has a long lifetime with respect to the other types of lighting members, such as an incandescent lamp and a halogen lamp. Thus, the lifetime of the lighting device constructed of the LEDs is greatly improved. Furthermore, the lighting devices are very small in size and thin in comparison with incandescent lamps and halogen lamps. Therefore, the lighting device using the lighting members can be decreased in size and weight. This results in a decrease in weight of a vehicle, and provides more space in an engine compartment. As a result, the flexibility in designing a vehicle improves.

The light emitting device includes the first light emitting device and the second lighting device. The first light emitting device is constructed of the first LED and the first light guide lens. The second light emitting device is constructed of the second LED and the second light guide lens. The first and the second LEDs are used as light sources. The first light guide lens confines light emitted from the first LED to an annular pencil. The second light guide lens spreads light emitted from the second LED.

The first light emitting device increases the intensity of the light in a specific area and the second light emitting device increases a light distribution area. A sensitivity of adjustment in the light distribution area and its intensity are improved when a combination of the fist and the second light emitting devices is properly made. In other words, the flexibility in altering light distribution is improved.

Furthermore, the lighting device does not require a reflector and a driving mechanism such as a motor. Therefore, the construction of the device is simple, the weight of the device is light, and the device is reliable.

In the lighting device for a vehicle, the first and the second light emitting devices are arranged in rows. Driving conditions are determined for the light distribution control of the lighting device. The first and the second light emitting devices are turned on or off based on the driving conditions. The intensity of the first and the second light emitting devices may be adjusted in the light distribution control in addition to turning on or off the devices.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1A:
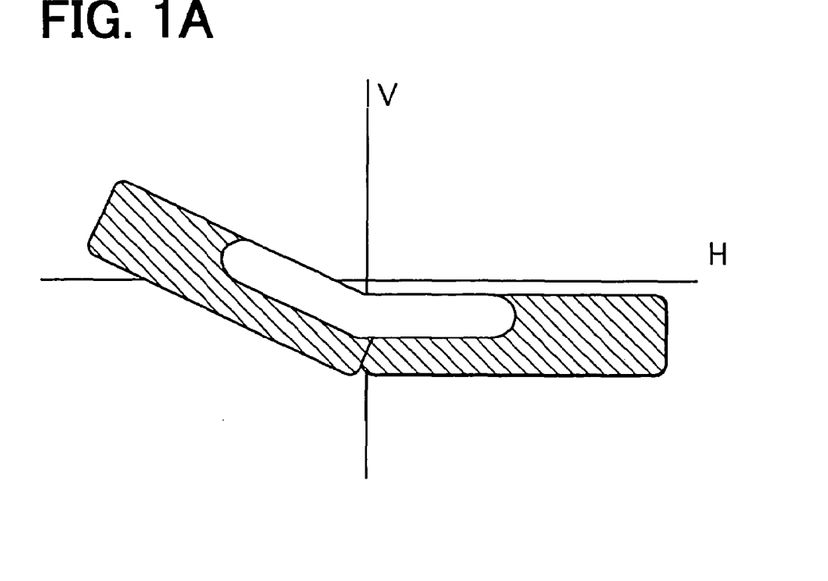
FIG. 1A is a graphical view showing light distribution areas of right and left headlights on a vertical wall according to an embodiment of the present invention.
Figure 1B:
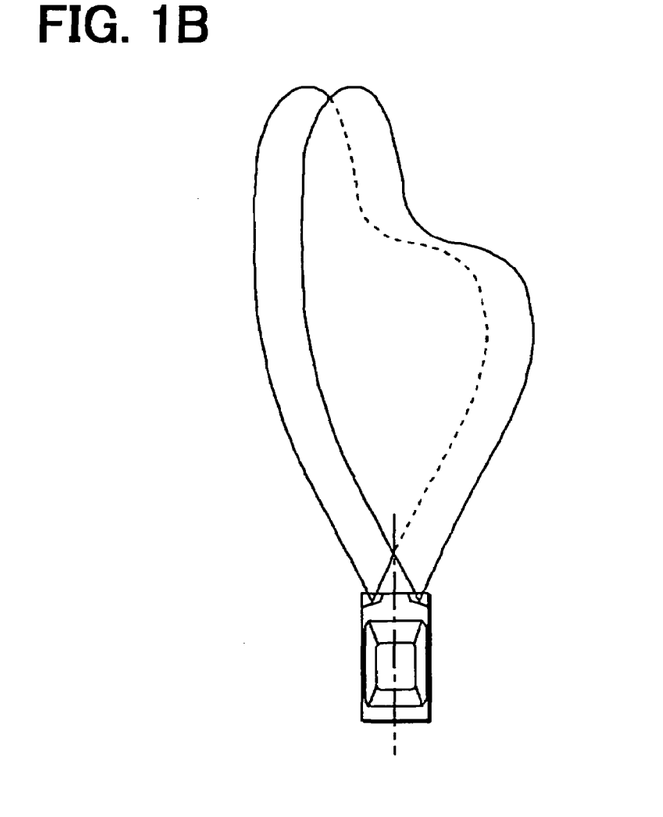
FIG. 1B is a plan view showing a vehicle and light distribution areas of the headlights.

Headlights for a vehicle are required to have low-beam (dimmer-beam) light distribution areas shown in FIGS. 1A and 1B under the left-hand driving regulations. Higher intensity is required in the white area shown in FIG. 1A compared with the rest of area.

Figure 2:
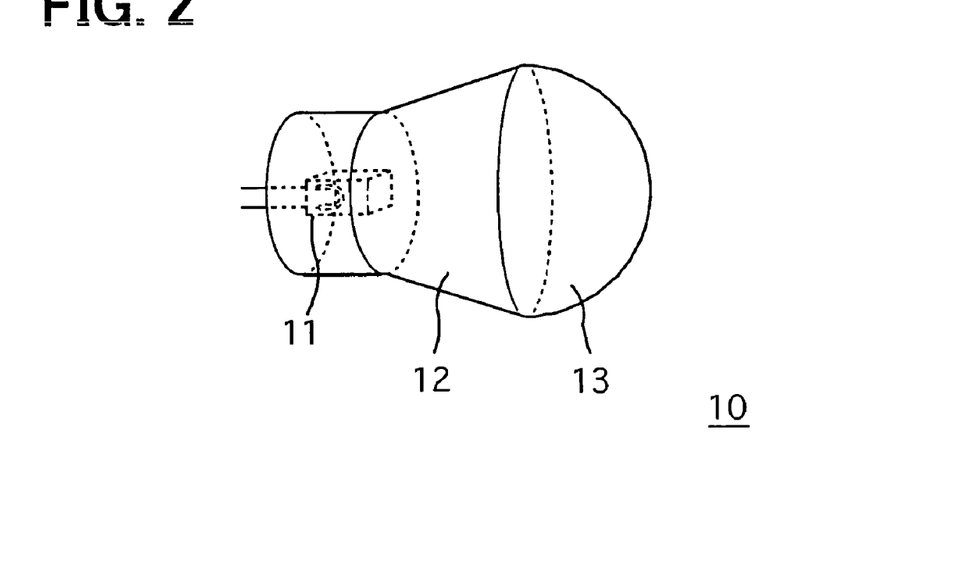
FIG. 2 is a perspective view showing a convex light emitting device according to the embodiment.
Figure 3A:
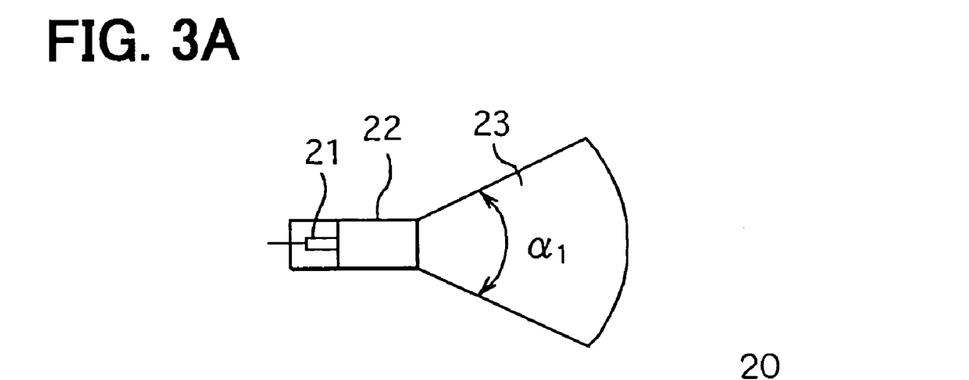
FIG. 3A is a horizontal cross-sectional view showing a fan-shaped light emitting device according to the embodiment.
Figure 3B:
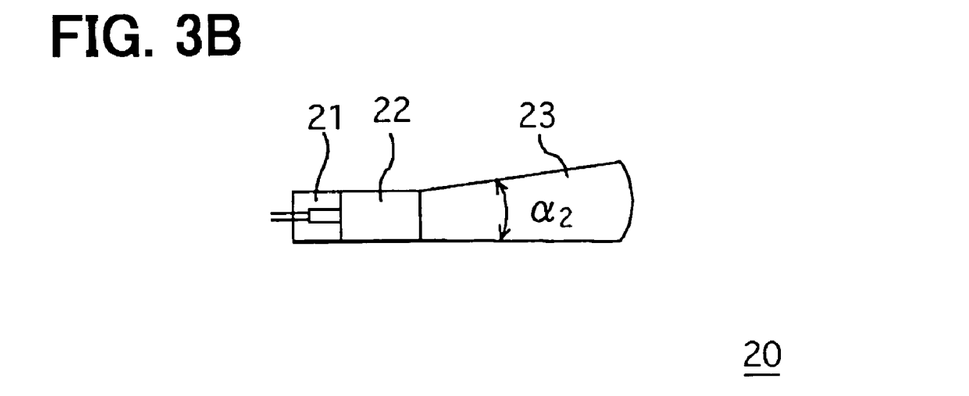
FIG. 3B is a vertical cross-sectional view showing the fan-shaped light emitting device shown in FIG. 3A.

Each headlight includes convex light emitting devices 10 (first light emitting devices) shown in FIG. 2 and fan-shaped light emitting device 20 (second light emitting devices) shown in FIG. 3. Each convex device 10 is constructed of a white light emitting diode (LED) 11, a guiding member 12, and a convex light guide lens 13. The white LED 11 is provided as a first LED for lighting a narrow area. The convex light guide lens 13 having a paraboloidal surface is provided as a first light guide lens for passing light from the white LED 11 to outside in the form of a parallel pencil of light. The guiding member 12 is arranged between the white LED 11 and the light guide lens 13. It guides the light emitted from the white LED 11 to the light guide lens 13 so that the light beam does not leak to the outside. The guiding member 12 and the light guide lens 13 are integrally formed from acrylic resin, in which the white LED 11 is mounted.

Each fan-shaped light emitting device 20 is constructed of a white LED 21 (second LED), a guiding member 22, and a fan-shaped light guide lens 23 (second light guide lens). The fan-shaped device 20 is provided for lighting a wide area. The fan-shaped light guide lens 23 widens a distribution area of the light emitted from the white LED 21. The guiding member 22 is arranged between the white LED 21 and the fan-shaped light guide lens 23. It guides the light emitted from the white LED 21 to the light guide lens 23 so that the light beam does not leak to outside. The guiding member 12 and the light guide lens 23 are integrally formed from acrylic resin, in which the white LED 21 is mounted.

Horizontal cross-sectional apex angle $\alpha 1$ and vertical cross-sectional apex angle $\alpha 2$ of the fan-shaped lens 23 are different from each other. The light distribution area is adjusted by setting the apex angle $\alpha 1$ and $\alpha 2$ at appropriate angles. Furthermore, the light distribution areas can be increased by forming the fan-shaped lens in a shape that fans out in both horizontal and vertical directions.

A single LED is used for each white LED 11, 21. However, a combination of three LEDs from each of which three primary colors are emitted can be used. In that case, yellowish color of the light can be produced for dense fog or bad weather conditions. Furthermore, the headlight can include a function of a turn signal indicator performed by flashing LEDs on the side in yellow according to an operation of the turn signal indicator.

The light emitting devices 10, 20 are configured to have different optical characteristics. An application of the light emitting devices having different optical characteristics has increased flexibility in altering light distribution.

Figure 4A:
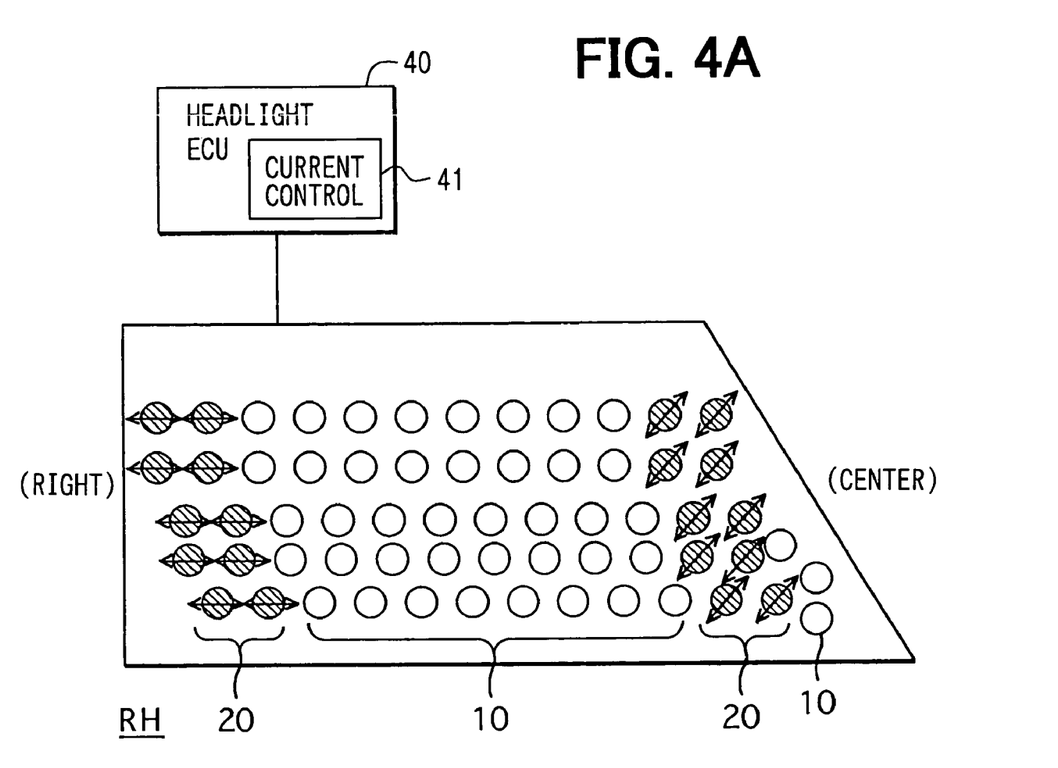
FIG. 4A is a plan view showing an arrangement of the convex light emitting devices and the fan-shaped light emitting devices installed in the right headlight according to the embodiment.
Figure 4B:
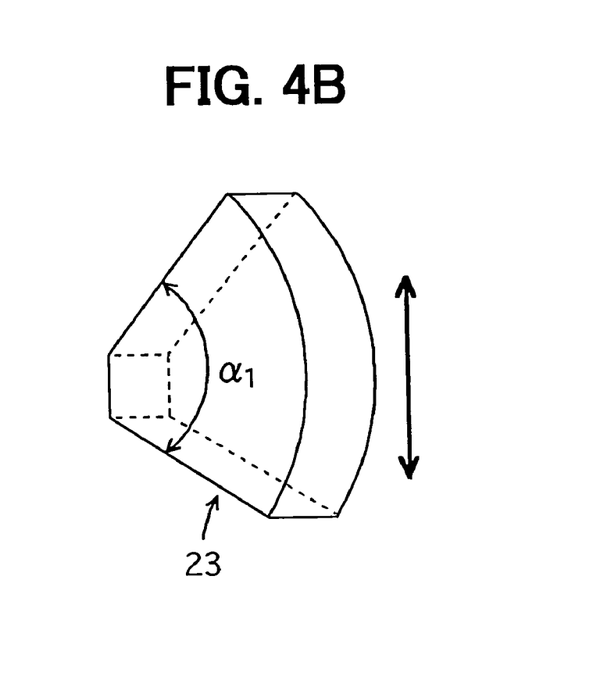
FIG. 4B is a perspective view showing a part of the fan-shaped light emitting device placed in an orientation that the fan-shaped light emitting device is installed in the headlight.

Referring to FIG. 4A, a right headlight RH has the convex devices 10 and the fan-shaped devices 20 arranged in rows. The convex devices 10 and the fan-shaped devices 20 are indicated with white circles and shaded circles on which arrows drawn across, respectively. Each arrow indicates an orientation of the fan-shaped lens 23 shown in FIG. 4B, that is an orientation of the apex angle $\alpha 1$. A front view of an outer frame of the right headlight RH is indicated with a trapezoid. The straight line on the left side of FIG. 4A and the sloped line are a right edge and a center edge of the right headlight RH, respectively.

The light distribution control of the headlight RH is performed by a headlight ECU 40 (light distribution control means). The headlight ECU is located outside the headlight RH. However, it can be installed in the headlight RH. The convex device 10 and the fan-shaped device 20 are independently wired. Therefore, the headlight ECU can independently control on-off switching and the intensity of each device 10, 20. The on-off switching and the intensity are controlled by adjusting the amount of current supply to the LEDs 11, 21 in the convex device 10 and the fan-shaped device 20. The current supply is controlled by a current control circuit 41 in the headlight ECU 40.

The headlight ECU 40 receives signals indicative of a variety of information corresponding to driving conditions from different sensors. The headlight ECU 40 controls the on-off switching and the intensity of the convex device 10 and the fan-shaped device 20 based on the signals. As a result, proper light distribution is provided according to the driving conditions.

Figure 5A:
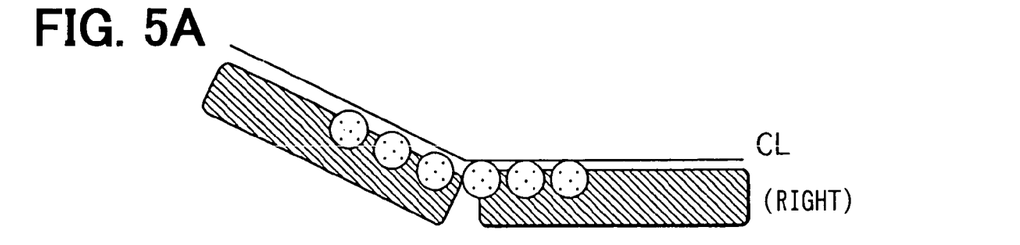
FIG. 5A is a graphical view showing the light distribution areas of the headlights at normal low-beam lighting.
Figure 5B:
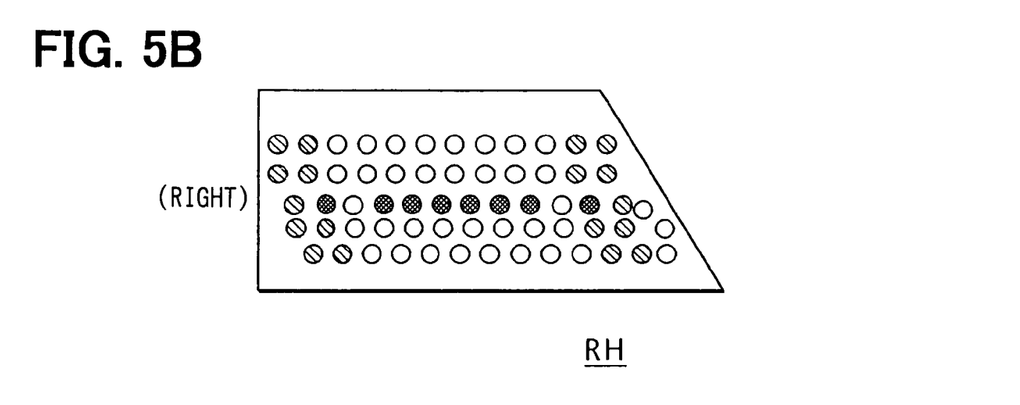
FIG. 5B is an explanatory view showing on-off conditions of the convex and the fan-shaped light emitting devices for providing the light distribution areas shown in FIG. 5A.

Light distribution areas of the headlights are provided on a vertical wall located a certain distance away from the headlight at low-beam lighting as shown in FIG. 5A. The on-off conditions of the convex devices 10 and the fan-shaped devices 20 are shown in FIG. 5B. The devices 10, 20 that are turned on are indicated with center dots. The devices 10, 20 in a center row are tuned on except for the ones on the right and the left sides. As a result, the light distribution areas are provided under a cutline CL. Furthermore, the intensity around the center portion of the light distribution areas is higher than the outer portions.

Figure 6A:
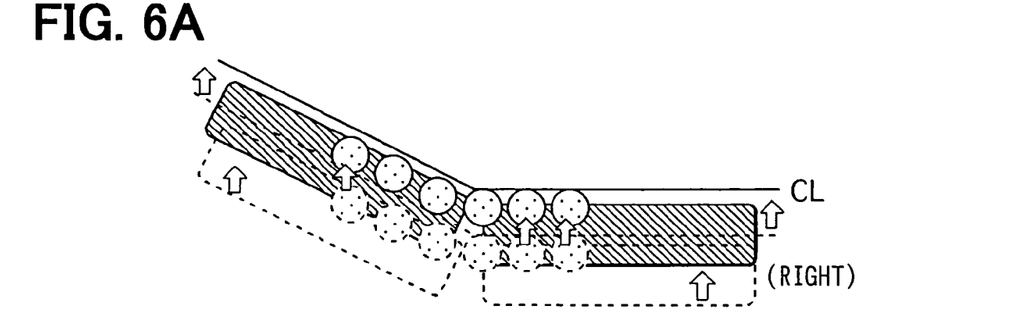
FIG. 6A is a graphical view showing the light distribution areas shifted higher with respect to the areas shown in FIG. 5A at low-beam lighting.
Figure 6B:
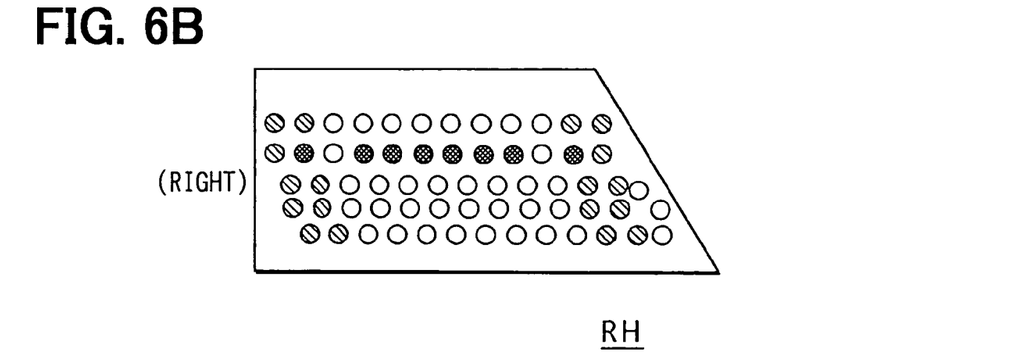
FIG. 6B is an explanatory view showing on-off conditions of the convex and the fan-shaped light emitting devices for providing the light distribution areas shown in FIG. 6A.

The light distribution control is also performed base on a variation in the height or the pitching motion of the vehicle. One example of the control is shown in FIG. 6. When a nose of the vehicle slightly goes down, a beam axis of the headlight is adjusted upward as shown in FIGS. 6A and 6B. The light emitting devices 10, 20 previously turned on shown in FIG. 5B are turned off and the devices 10, 20 in the row one above are turned on. Therefore, the light distribution of the headlight is properly provided even when the nose of the vehicle slightly has gone down. Likewise, when the nose of the vehicle slightly goes up, the beam axis of the headlight is adjusted downward so that the light distribution of the headlight is properly provided.

Which row of the emitting devices 10, 20 are turned on is determined based on the pitching motion of the vehicle. In other words, the emitting devices 10, 20 to light may be shifted more than one row from the previously turned on devices 10, 20. Alternatively, more than one row of the emitting devices 10, 20 may be turned on in addition to the devices 10, 20 that are previously turned on when the pitching motion occurs.

The beam axis adjustment is performed by the headlight ECU 40 based on information about the height of the vehicle and a pitching angle provided by a leveling sensor and a pitching angle sensor, respectively. More specifically, a correction angle for adjusting the beam axis is determined based on the information, and then which row of the emitting devices 16, 20 are turned on or off is determined. The beam axis may be further adjusted based on a vehicle speed detected by a speed sensor.

Figure 7A:
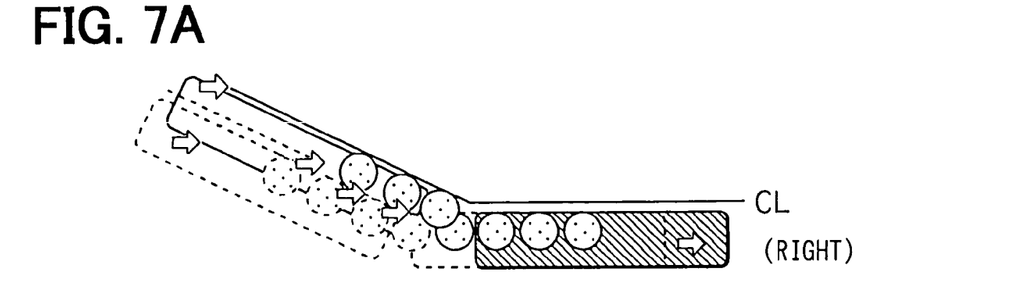
FIG. 7A is a graphical view showing the light distribution areas shifted to right with respect to the areas shown in FIG. 5A at low-beam lighting.
Figure 7B:
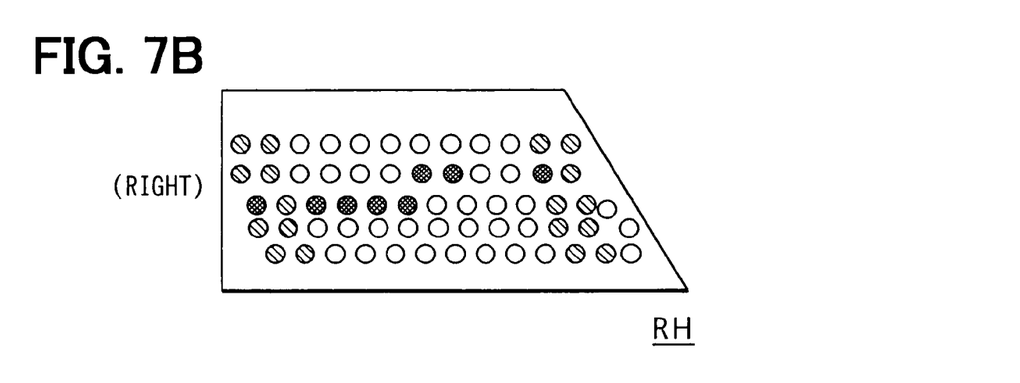
FIG. 7B is an explanatory view showing on-off conditions of the convex and the fan-shaped light emitting devices for providing the light distribution areas shown in FIG. 7A.

The beam axis is also adjusted in a horizontal direction according to changes in the traveling direction of the vehicle during making a turn or a curve. For example, the beam axis is adjusted as shown in FIGS. 7A and 7B when the vehicle goes around a curve to the right. In this case, the beam axis is shifted to the right. More specifically, the devices 10, 20 located around the center of the headlight RH are turned off, and a larger number of the devices 10, 20 located in the right area are turned on as shown in FIG. 7B. As a result, an area around the end of the curve is properly lit, which improves the visibility of a driver.

In a case that the vehicle goes around a curve to the left, the beam axis adjustment is performed in the same manner as above. The amount of beam adjusting is determined based on the steering angle of the vehicle. For the adjustment, the currently turned-on devices 10, 20 are turned off and appropriate devices are turned on. Alternatively, a larger number of the devices 10, 20 are turned on as required in addition to the currently turned-on devices 10, 20 to widen a right or a left lighting area. Furthermore, the intensity control may be performed for improving the lighting the area around the end of the curve.

The beam axis adjustment is performed by the headlight ECU 40 based on information about the steering angle of the vehicle and a posture of the driver. The information is obtained from the steering angle sensor provided at a steering wheel, from an acceleration sensor, and from a breaking deceleration sensor installed in the vehicle. More specifically, a correction angle or the intensity for the adjustment is determined based on the information. Then, which emitting devices 10, 20 are turned on or off, or the intensity is determined, in other words, emission control of the light emitting devices 10, 20 is performed. The on-off control or the intensity control is performed based on the determination.

The beam axis and the intensity may be further adjusted based on the driving condition of the vehicle detected by the speed sensor. When the intensity control is performed, the intensity is increased in specific devices or gradually increased from the center to the edge.

Figure 8A:
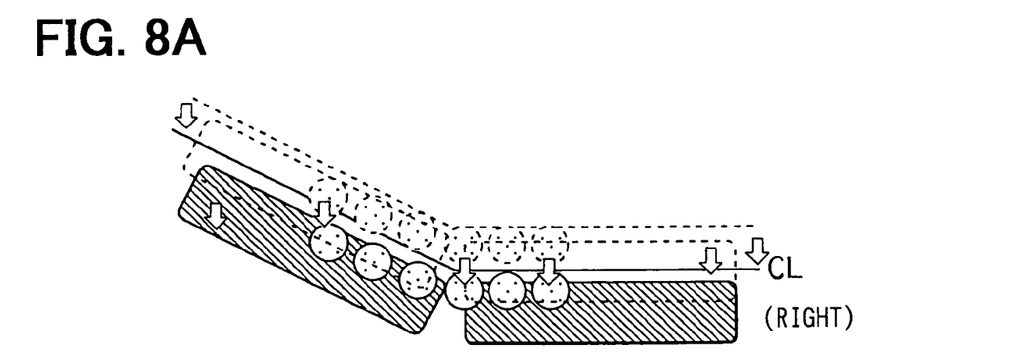
FIG. 8A is a graphical view showing the light distribution areas shifted lower with respect to the areas shown in FIG. 5A at low-beam lighting.
Figure 8B:
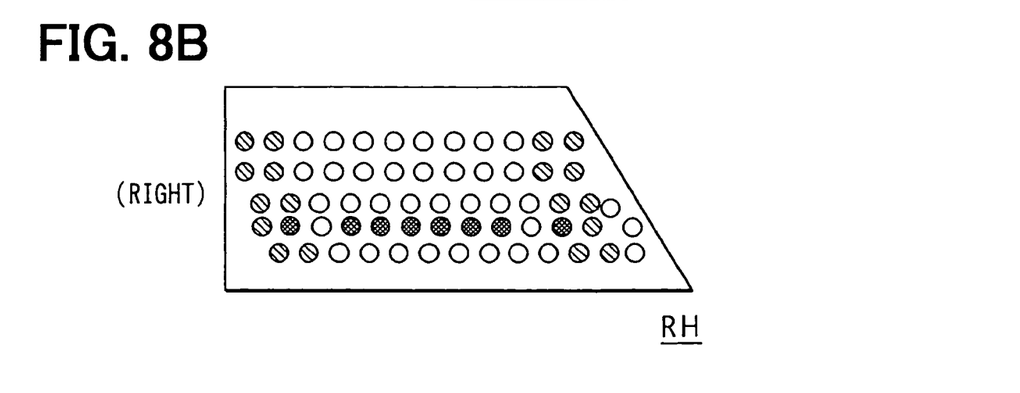
FIG. 8B is an explanatory view showing on-off conditions of the convex and the fan-shaped light emitting devices for providing the light distribution areas shown in FIG. 8A.

The light distribution control under bad weather conditions, for example in the fog, is shown in FIGS. 8A and 8B. In this example, the vehicle travels at a reduced speed. When the devices 10, 20 in the row lower than that shown in FIG. 5B are turned on, the lighting area on the vertical wall ahead of the head light is shifted downward as shown in FIG. 8A. The light distribution control is performed by the headlight ECU 40 based on an instruction from the driver in addition to information obtained from outside air temperature and moisture sensors.

The visibility can be further improved by controlling the intensity and the coloration of the devices 10, 20. The coloration control can be implemented when red-green-blue (RGB) LEDS are used instead of the white LEDs 11, 21. Under the normal condition, the LEDs of all three colors are lit to produce white. Under the bad weather condition, the red LEDs and the green LEDs are lit to produce yellowish white. As a result, the fog lamp function can be performed by the headlight.

Figure 9A:
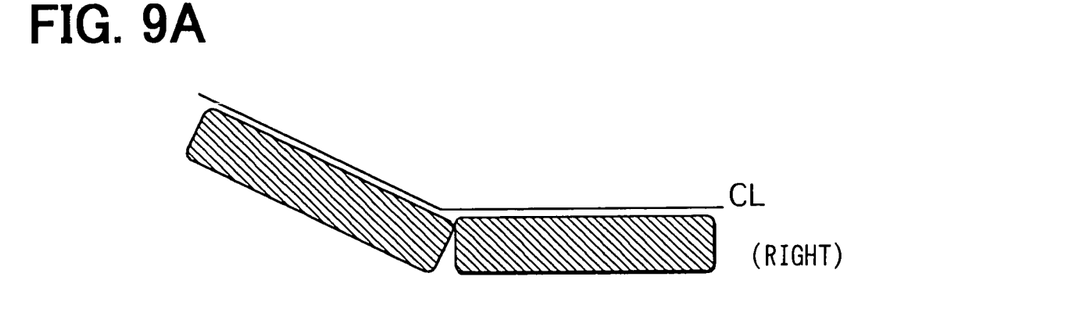
FIG. 9A is a graphical view showing the light distribution areas at low-beam lighting in a lighted environment.
Figure 9B:
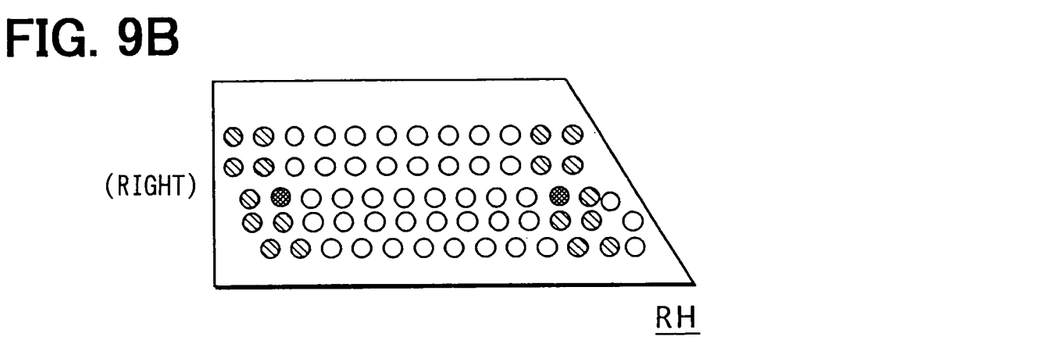
FIG. 9B is an explanatory view showing on-off conditions of the convex and the fan-shaped light emitting devices for providing the light distribution areas shown in FIG. 9A.

When the vehicle travels in a lighted area, the light distribution control is performed as shown in FIGS. 9A and 9B. The convex devices 10 in the center area for lighting a hot zone are turned off and the fan-shaped devices 20 in the outer areas are turned on. As a result, the light distribution areas of the headlights have the even intensity. The intensity of the convex devices 10 may be reduced instead of being tuned off.

Figure 10A:
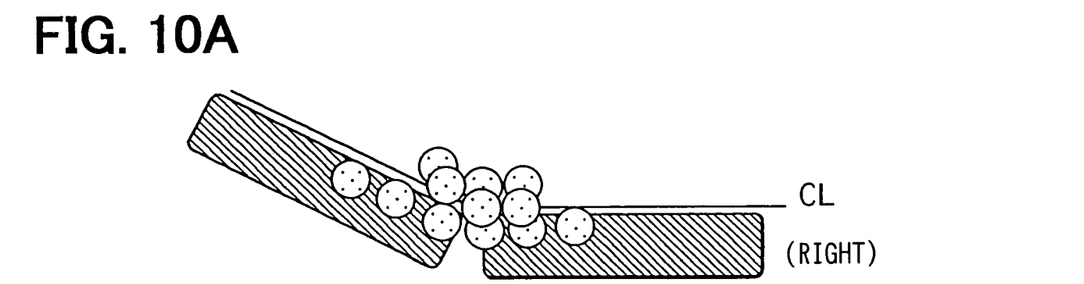
FIG. 10A is a graphical view showing the light distribution areas at high-beam lighting.
Figure 10B:
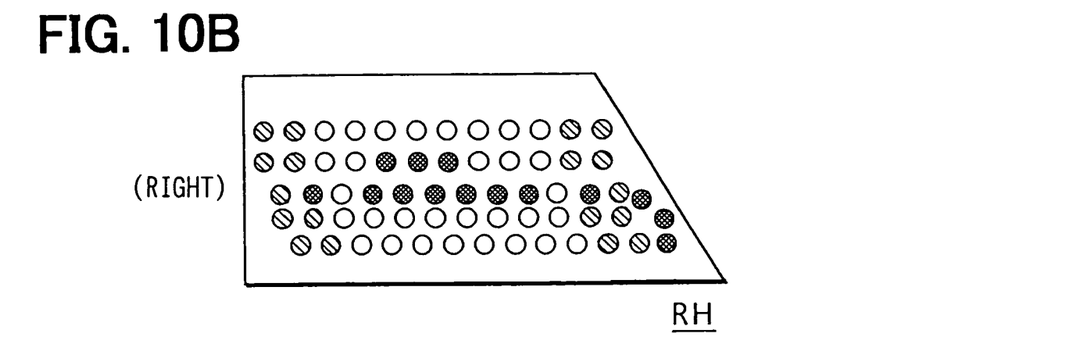
FIG. 10B is an explanatory view showing on-off conditions of the convex and the fan-shaped light emitting devices for providing the light distribution areas shown in FIG. 10A.

The light distribution control for high beams (main beams) of the headlight is performed as shown in FIGS. 10A and 10B. More convex devices 10 located in the center area are turned on in addition to the lit devices 10 in FIG. 5B. As a result, the beams reach a further distance. It is preferable that the intensity of the devices 10, 20 that are turned on for normal low-beam lighting is increased for increasing the intensity near the cutline CL. This improves the visibility.

Figure 12:
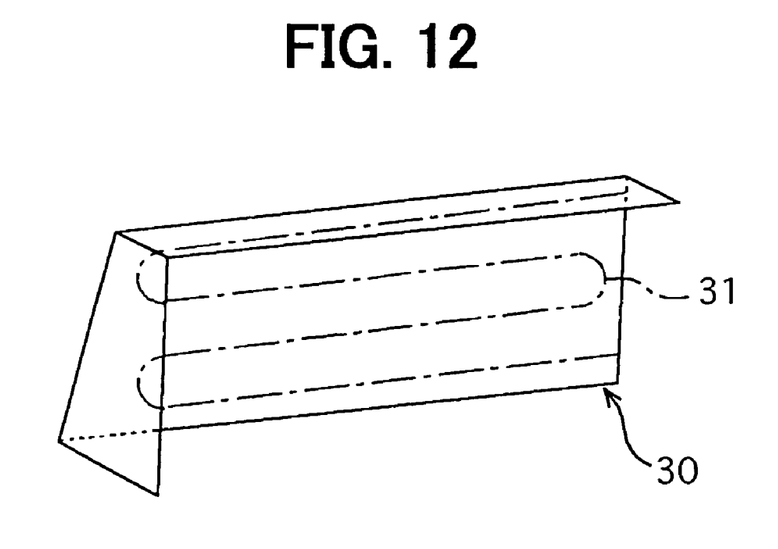
FIG. 12 is a perspective view showing a headlight cover for the headlight.

It is preferable that the headlights have a headlight cover (lighting-device cover) 30 shown in FIG. 30 for covering front surfaces of the light emitting devices 10, 20. The cover protects the devices 10, 20 from damages due to fly rocks that may hit the headlights while the vehicle is traveling.

It is further preferable that the headlight cover 30 has a heating device, such as a thing hot-wire 31, an Indium Tin Oxide (ITO) film, a transparent heating film. The heating device is used for defrosting the headlights for clear lighting when the headlights become frosty in the snowy or the low temperature condition. Therefore, the visibility of the driver improves. Alternatively, the headlight cover 30 may be heated by the heated air from an engine compartment. On-off control of the heating device may be performed manually by the driver or automatically by the headlight ECU 40 based on outside conditions detected by the outside air temperature sensor.

Figure 11A:
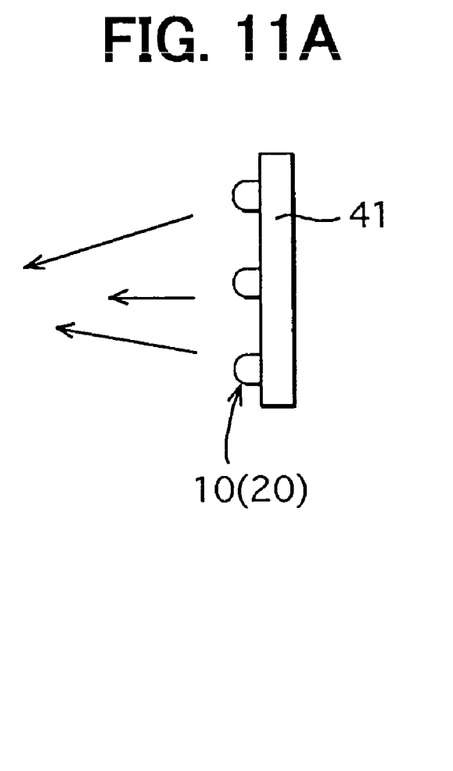
FIG. 11A is a side view showing the light emitting devices mounted on a planate substrate.
Figure 11B:
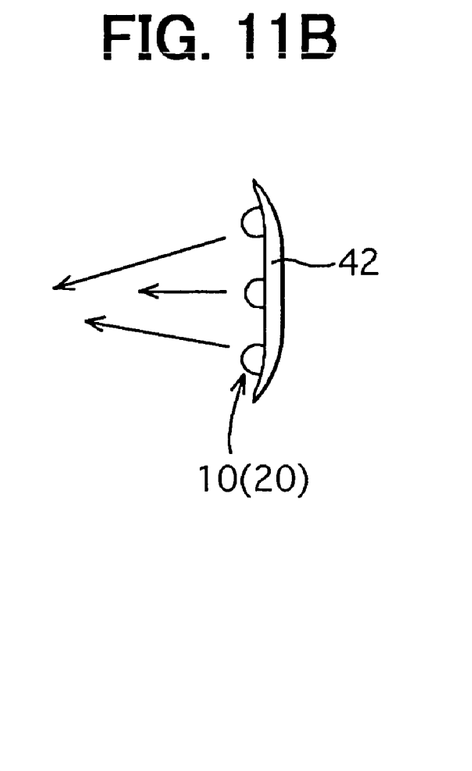
FIG. 11B is a side view shown the light emitting devices mounted on a concave substrate.

The present invention should not be limited to the embodiment previously discussed and shown in the figures, but may be implemented in various ways without departing from the spirit of the invention. For example, the plate to which the devices 10, 20 are mounted is not limited to a flat plate. The plate can be a curved plate shown in FIG. 11B. The same type of LEDs can be used for the first LED 11 and the second LED 21.

It is preferable that the convex light guide lens has a paraboloidal surface so that light emitted from the diode 11 is diffused in parallel rays, which makes the intensity adjustment easy. Moreover, the light distribution area can be adjusted by altering the lens aperture. The lenses may be formed in different shapes suitable for each light emitting device as long as the manufacturing cost is maintained.

By integrating the LED 11 with the convex lens 13, the handleability of them increases. It also reduces a loss of light due to the air between the LED 11 and the convex lens 13. They are easily integrated by making the convex lens 13 from an acrylic resin or a polycarbonate resin.

The red LED is made from AlGaAs, GaAsp, or GaP (Zn—O), the green LED is made from GaP (N), and the blue LED is made from GaN or Sic. Which material to use can be determined based on the color requirements for the lighting device.

It is preferable that the light distribution area is provided further from the vehicle when the vehicle speed is high. On the other hand, it is preferable that the light distribution area is closer to the vehicle when the vehicle speed is low.

The information about the steering angle and the traveling direction is useful for adjusting the beam-axis of the headlight in the horizontal direction. The information about the vehicle height, the pitching angle, the vehicle speed, the acceleration speed, and the breaking deceleration speed is useful for adjusting the beam-axis in the vertical direction.

The information is also useful for adjusting the beam-axis of a stop lamp, a turn signal indicator lamp, a clearance lamp, a tale lamp, and a license plate lamp. The information about the traveling direction is especially useful for activating the turn signal indicator.

The information about the weather conditions, such as rain, fog, and snow, is useful for activating the clearance lamp, the tale lamp, and the license plate lamp. The weather information may further include daytime and nighttime.

It is preferable that the headlights have a headlight cover (lighting-device cover) 30 shown in FIG. 12 for covering front surfaces of the light emitting devices 10, 20. The cover protects the devices 10, 20 from damages due to fly rocks that may hit the headlights while the vehicle is traveling.

It is further preferable that the headlight cover 30 has a heating device, such as a thing hot-wire 31, an Indium Tin Oxide (ITO) film, a transparent heating film. The heating device is used for defrosting the headlights for clear lighting when the headlights become frosty in the snowy or the low temperature condition. Therefore, the visibility of the driver improves. On-off control of the heating device may be performed manually by the driver or automatically by the headlight ECU 40 based on outside conditions detected by the outside air temperature sensor.

What is claimed is:

1. A lighting device for a vehicle comprising:
   a frame;
   a first group of a plurality of first light emitting devices disposed at a first area of the frame; and
   a second group of a plurality of second light emitting devices disposed at a second area of the frame, wherein:
   each light emitting device is constructed of a light emitting diode, a guiding member and a convex light guide lens integrated with the guiding member; and
   the second light emitting devices have optical characteristics different from the first light emitting devices thereby providing a prescribed light distribution area in front of the lighting device.

2. The lighting device according to claim 1, wherein the first light guide lens is a normal convex lens and the second light guide lens is a fan-shaped lens.

3. The lighting device according to claim 2, wherein the fan-shaped lens is formed in a shape that fans out in horizontal and vertical directions.

4. The lighting device according to claim 1, wherein: some of the light emitting devices include diodes that emit different colors of light; and each light emitting device uses a combination of the diodes that emit different colors of light as a light source.

5. The lighting device according to claim 1, further comprising a light distribution control means for controlling light emission of the light emitting devices according to driving conditions of the vehicle.

6. The lighting device according to claim 5, wherein:
   the driving conditions are determined based on information obtained from a sensor; and
   the information includes at least one of a steering angle, a vehicle height, a pitching angle, a vehicle speed, a traveling direction, an acceleration speed, a breaking deceleration, an outside air temperature, and a humidity.

7. The lighting device according to claim 1, further comprising a heatable lighting-device cover that entirely covers the lighting device.

8. The lighting device according to claim 1, wherein the lighting device is used in a headlight of the vehicle.

9. A lighting device for a vehicle comprising a first group of first light emitting devices having first optical characteristics and a second group of second light emitting devices having second optical characteristics different from the first optical characteristics, wherein:
   each of the first light emitting devices includes a convex lens and each of the second light emitting devices includes a fan-shaped lens; and
   the fan-shaped lens is formed in a shape that fans out in horizontal and vertical directions.

10. A lighting device for a vehicle lamp comprising a first group of a plurality of first light emitting devices disposed at a first location of the device and a second group of a plurality of second light emitting devices disposed at a second location of the device, wherein:
   each of the first light emitting devices projects light to a first area in front of the vehicle in one form;
   each of the second light emitting devices projects light in a second area in front of the vehicle in another form; and
   further comprising control means for controlling operation of at least one of the first and second light emitting devices so as to distribute light in front of the vehicle in a prescribed pattern, wherein:
   the control means controls on-off switching of the first light emitting devices according to driving conditions of the vehicle, each of the first light emitting devices includes a convex lens, and each of the second light emitting devices includes a fan-shaped lens.

11. The lighting device according to claim 10, wherein the control means controls the first light emitting devices to distribute light upward when the vehicle speed increases.

12. The lighting device according to claim 10, wherein the control means controls the first light emitting devices to distribute light leftward and rightward when the vehicle turns left or right.

13. A lighting device for a vehicle lamp comprising a first group of a plurality of first light emitting devices disposed at a first location of the device and a second group of a plurality of second light emitting devices disposed at a second location of the device, wherein:

each of the first light emitting devices projects light to a first area in front of the vehicle in one form;

each of the second light emitting devices projects light in a second area in front of the vehicle in another form; and further comprising control means for controlling operation of at least one of the first and second light emitting devices so as to distribute light in front of the vehicle in a prescribed pattern, wherein the control means controls the first light emitting devices to distribute light upward or downward when the nose of the vehicle goes down or goes up.

14. A lighting device for a vehicle comprising:

a frame;

a first group of a plurality of first light emitting devices disposed at a first area of the frame; and a second group of a plurality of second light emitting devices disposed at a second area of the frame and, wherein:

each of the first light emitting devices projects light to a first area in the form of parallel pencil of light; and each of the second light emitting devices distributes light in a second area that is wider than the first area.

* * * * *